Figures 1, 2, 3:
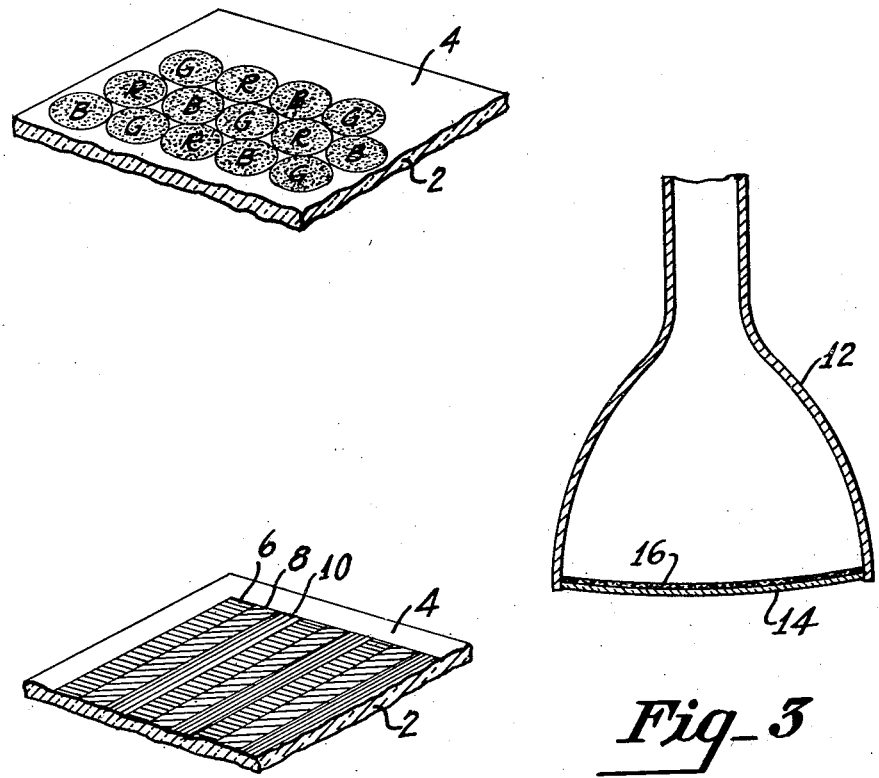

Aug. 13, 1957 G. E. CROSBY ET AL 2,802,753
TRI-COLOR KINESCOPE SCREEN
Filed Oct. 15, 1953

INVENTORS
JOHN A MARKOSKI AND
GILMORE E. CROSBY

BY W. S. Hill
AGENT

United States Patent Office 2,802,753
Patented Aug. 13, 1957

2,802,753
TRI-COLOR KINESCOPE SCREEN

Gilmore E. Crosby and John A. Markoski, Lancaster, Pa., assignors to Radio Corporation of America, a corporation of Delaware Application October 15, 1953, Serial No. 386,288

7 Claims. (Cl. 117—33.5)

This invention relates to luminescent viewing screens which may be used in color television kinescopes. More particularly, the invention relates to screens composed of a combination of phosphors having improved decay characteristic matching.

One type of viewing screen which has been used in color television kinescopes is composed of a multiplicity of discrete phosphor elements. These elements may be, for example, lines or dots. If the screen is intended to display three different primary colors, the phosphor elements are arranged in triads, each triad consisting of dots each of which is composed of a phosphor emitting one of the three colors. It is possible, however, to make screens in which there are more elements of one color-emitting phosphor than there are of either of the others.

There are also three-color type kinescope tubes employing non-planar arrangements of phosphor elements sensitive to the direction of arrival of an electron beam. There are many variations of this type of screen, such as those employing a multiplicity of tiny pyramids or ridges. An example of this type of screen is described in British Patent 562,168. All of the phosphors need not be on the same side of the screen.

It is also possible to make kinescope viewing screens composed of a uniform mixture of three or more different phosphors each of which emits a different color. Color filters must then be placed between the viewer and the face plate of the tube in order to utilize the screen for color television.

There are a number of problems which must be taken into consideration in making suitable viewing screens for three-color television kinescopes. Many of these problems are concerned with the selection of the phosphors which may be used. The television system circuitry places some limitations on the types of phosphors which may be utilized in the kinescope. However, in general, the phosphors in a tri-color tube which is to luminesce with the primary colors, red, green and blue, for example, must be selected to have many particular properties including the following:

(1) All of the phosphors must have the highest obtainable luminescence at the ordinary operating voltages and currents of the tube.

(2) The maximum brightnesses of all three prosphors must be matched as closely as possible.

(3) The brightness of emission of the three phosphors must be comparable at any given operating potential and current density.

(4) The emission colors of the phosphors must each be satisfactory as to depth and shading.

(5) All of the phosphors must exhibit good stability over long periods of operation.

(6) All of the phosphors must exhibit similar color saturation characteristics at operating voltages and currents.

(7) The phosphors should preferably be matched as nearly as possible with respect to decay characteristics.

Because of all of the factors which must be taken into consideration in selecting phosphors for color television kinescope screens, as described above, the manufacture of acceptable viewing screens has proved to be a very difficult problem.

In the improved phosphor screen of the present invention, a combination of phosphors has been utilized which not only has desirable color matching, color saturation values, stability, etc., but also has good matching of decay characteristics. Furthermore, all three phosphors have sufficiently short decay periods so that rapid scanning can be used and "flicker" can thereby be avoided.

One object of the present invention is to provide an improved tri-color kinescope viewing screen.

Another object of the present invention is to provide a tri-color kinescope viewing screen in which all of the phosphors have improved decay characteristic matching.

A further object of the present invention is to provide an improved three-color kinescope viewing screen in which all of the phosphors have high luminescence efficiencies.

These and other objects will be more apparent and the invention will be more fully described by reference to the accompanying drawing, in which—

Fig. 1 is a perspective view, greatly enlarged, of a portion of one embodiment of a tri-color kinescope screen in accordance with the present invention, Fig. 2 is a perspective view, greatly enlarged, of a portion of a viewing screen in accordance with a second embodiment of the present invention, and Fig. 3 is a cross-section, elevation view of a cathode ray tube envelope including a viewing screen in accordance with a third embodiment of the present invention.

A principal feature of the present invention is the provision of a tri-color kinescope viewing screen including a combination of phosphors comprising a red-emitting phosphor selected from the class consisting of zinc selenide and zinc cadmium selenide with copper in activator proportions, a blue-emitting phosphor having a peak emission wavelength of less than about 470 m$\mu$, and a green-emitting phosphor comprising zinc orthosilicate containing about 2 to 3% by weight manganese activator.

An important feature of the present invention is the utilization of an improved form of manganese-activated zinc orthosilicate having rapid decay characteristics and, at the same time, high luminescence efficiency and satisfactory peak emission color. Previously used tri-color television kinescope screens having red-emitting, blue-emitting and green-emitting phosphors have exhibited the defect known as "green trailing" which was caused by the green emission having somewhat longer persistence than either the red or the blue. When one of the emission colors persists longer than any of the others, rapidly moving objects may appear blurred on the viewing screen and color rendition of moving objects may be faulty. To eliminate the defect it is now proposed to use zinc silicate activated with from about 2 to 3% by weight of manganese instead of the much lower percentages previously used. Using this relatively high percentage of manganese, the luminescence of the green-emitting phosphor decays to about 5% of its initial brilliance in 20 milliseconds. Standard willemite, previously used, is zinc orthosilicate activated with about .3% by weight manganese. This phosphor decays to 20% of its initial brightness in 20 milliseconds.

Another change in the conventional manganese activated zinc silicate phosphor composition also had to be made in accordance with the present invention in order to make a material suitable for use in tri-color kinescope screens. It was found that when the manganese content was increased to 2 to 3% by weight that the emission characteristics suffered considerably. The efficiency, for example, became unsatisfactory.

Previously, in preparing manganese activated zinc silicate for use in television kinescopes, it had become standard practice to include a relatively small percentage of barium carbonate in the composition in order to control secondary emission in the phosphor and thus reduce screen burning. In preparing the improved materials used to make the improved screen of the present invention, it was found that if the barium carbonate were eliminated, emission characteristics were greatly improved, in fact they became entirely satisfactory, and secondary emission was not troublesome. Therefore, the improved screen of the present invention includes the use of zinc silicate phosphor without the customary barium carbonate which had been previously thought necessary in making kinescope viewing screens.

An example of preparation of an improved viewing screen in accordance with the present invention will now be given. First, the preparation of a suitable form of the green-emitting phosphor will be described. The improved phosphor is made by mixing zinc oxide, anhydrous silicic acid and manganese carbonate in the following proportions:

| | Gms. |
|---|---|
| Zinc oxide | 44 |
| Silicic acid (anhydrous) | 20.42 |
| Manganous carbonate | 3.102 |

The above mixture is stirred into 120 cc. distilled water and the mixture is thoroughly milled and then dried. The dried mixture is then fired at about 1225° C. for about one hour. The fired product is then mixed with water in the proportions of 12 gms. of phosphor to 10 cc. of water and milled for twenty-four hours; this slurry is dried and screened through a 250-mesh screen. The product is a phosphor suitable for use in the improved screen of the present invention.

In the above composition the magnanese content is about 2.23% by weight, but this can be varied between about 2 and 3% by weight. Other variations can be made in the preparation of the green-emitting phosphor within the scope of the present invention. The manganese can be added in the form of compounds other than the carbonate. Firing temperature is not particularly critical, and the length of firing time may be anywhere from a few minutes to several hours depending upon the size of the batch being fired. The milling operations are also not critical. Any kind of processing can be used which will produce finely ground particles.

In making a tri-color kinescope viewing screen in accordance with the present invention, the red-emitting phosphor is preferably one from a class consisting of zinc selenide and zinc cadmium selenide with activator content of about .003 to .03% copper by weight. The ratio by weight of zinc to cadmium, where both metals are used, should be at least 8:1.

The phosphor of the blue-emitting element should have a peak emission wavelength of less than about 470 m$\mu$. The blue-emitting phosphor should also have a color saturation value about the same as that of the red-emitting phosphor and of the green-emitting phosphor. A preferred example of suitable blue-emitting phosphor is a material from the class consisting of zinc sulfide and zinc seleno-sulfide in which the ratio of sulphur to selenium is at least 8:1 by weight and containing about .005 to .025% by weight silver activator.

The above-described phosphor combination may be utilized in a viewing screen as follows:

Referring now to Fig. 1, this screen may comprise a transparent glass base plate 2 having disposed on one side 4 thereof a multiplicity of adjacent phosphor dot triads. Each triad includes a dot "R," composed of a red-emitting phosphor as previously described, a second dot "G" of a green-emitting phosphor, such as previously described, and a third dot "B" of a blue-emitting phosphor having the characteristics previously referred to. In one preferred form of screen, the three dots of each triad lie at the corners of an equi-lateral triangle, and the dots are closely packed with little or no space between. The dots may be placed on the glass plate by a conventional silk screen process using the technique as described, for example, in U. S. Patent 2,625,734 to H. B. Law except that, because of the improved phosphor combination used in the present invention, there is no present need to dilute any of the phosphors because of a lack of color brilliance.

One of the methods of applying the phosphor dots described in the above-mentioned Law patent includes the use of phosphor pastes made by incorporating each phosphor with a particular binder. If these pastes are relatively fluid in nature, the dots will flow slightly after being applied to the plate. That is, they will spread out to a diameter which is slightly larger than the diameter originally deposited. All of the dots of one phosphor are laid down at one time and the three phosphors are deposited successively. All of the red dots may be put on first, these are dried, the green dots may then be laid down, and so on, until the viewing screen has been covered. It will thus be apparent that the phosphor dots that are first laid down will be slightly larger in diameter than when originally deposited but will retain their circular shape. The next set of dots to be laid down will touch the dots of the first set, each dot making contact at two different points on its periphery, and at these points the dots will be slightly irregular due to flowing around the dots first laid down. The last set of dots to be laid down will flow to fill up the unused spaces and therefore will be substantially hexagonal in shape. This does not affect the operation of the screen, but it will be understood, therefore, that by "dots" is meant anything of a dot-like nature and does not refer only to a circular configuration.

Referring now to Fig. 2, the red-, green- and blue-emitting phosphors, as previously described, may also be deposited on a glass face plate of a cathode ray tube in the form of adjacent line elements. In this form of screen, a glass face plate 2 has applied to a surface 4 thereof a multiplicity of very thin parallel lines of phosphors, each phosphor occurring in a particular order of cyclic succession. For example, the order may comprise a line 6 of red-emitting phosphor followed by a line 8 of green-emitting phosphor and a line 10 of blue-emitting phosphor. Any other desired arrangement of these elements can also be used. For example, there may be twice as many red lines as green lines and blue lines or the red lines may be made slightly thicker than the green lines or the blue lines.

As indicated previously, it is not absolutely necessary that the three phosphors be laid down on the base plate in the form of discrete elements. In one form of color television, a viewing screen is utilized comprising a layer of a uniform mixture of the different color-emitting phosphors. The phosphor combination heretofore described may also be advantageously used in this type of screen since the phosphors are subject to substantially the same requirements which apply to the type of screen comprising discrete phosphor elements.

A screen employing a uniform phosphor layer is shown in Fig. 3. Referring to Fig. 3, a conventional cathode ray tube envelope 12 includes a glass face plate 14 having on a surface thereof a layer 16 of a phosphor composition comprising a uniform mixture of the red-emitting, blue-emitting and green-emitting materials previously described.

Although the invention has been illustrated as being applied to a viewing screen including a glass face plate, it will be apparent that it applies also to an opaque face plate intended to be viewed by reflected instead of transmitted light.

There has thus been described an improved viewing screen for color television kinescopes. This improved screen gives better performance with respect to decay characteristic matching and high luminescence efficiency of all three phosphors than previously manufactured viewing screens.

What is claimed is:

1. A tri-color kinescope viewing screen comprising a base plate having disposed thereon luminescent substances comprising a red-emitting phosphor selected from the class consisting of zinc selenide and zinc cadmium selenide in which the ratio of zinc to cadmium is at least 8:1 by weight and containing .003 to .03% by weight copper activator, a blue-emitting phosphor having a peak emission wave-length of less than about 470 m$\mu$ and a color saturation value about the same as that of standard "willemite," and a green-emitting phosphor comprising zinc orthosilicate containing about 2 to 3% by weight manganese activator.

2. A luminescent viewing screen comprising a base plate having disposed on a surface thereof a multiplicity of groups of discrete phosphor elements occurring in a predetermined order of cyclic succession, each of said groups consisting of a red-emitting element in which the phosphor is selected from the class consisting of zinc selenide and zinc cadmium selenide in which the ratio of zinc to cadmium is at least 8:1 by weight and containing about .003 to .03% by weight copper activator, a green-emitting element in which the phosphor comprises zinc orthosilicate containing about 2 to 3% by weight manganese activator, and a blue-emitting element comprising a short persistence phosphor selected from the class consisting of zinc sulfide and zinc seleno-sulfide in which the ratio of sulfur to selenium is at least 8:1 by weight and containing about 0.005 to 0.025% by weight silver activator.

3. A screen according to claim 2 in which said base plate is composed of transparent glass.

4. A screen according to claim 2 in which said blue-emitting phosphor is silver-activated zinc sulfide.

5. A screen according to claim 2 in which said elements are dot-like.

6. A screen according to claim 2 in which said phosphor elements are lines.

7. Luminescent means for a color television reproducer comprising discrete areas of different phosphors, each phosphor area capable of emitting light in one of three different colors when excited with cathode rays, the first of said phosphors comprising a red-emitting phosphor; the second of said phosphors comprising a blue-emitting phosphor having a peak emission wavelength of less than about 470 m$\mu$ and a color saturation value about the same as "willemite"; and the third of said phosphors comprising zinc orthosilicate containing about 2 to 3% by weight of manganese activator, all of said phosphors having substantially the same persistence.

References Cited in the file of this patent

UNITED STATES PATENTS

| | | |
|---|---|---|
| 2,485,607 | Kasperowicz | Oct. 25, 1949 |
| 2,622,220 | Geer | Dec. 16, 1952 |
| 2,625,734 | Law | Jan. 20, 1953 |
| 2,659,679 | Koller | Nov. 17, 1953 |

FOREIGN PATENTS

| | | |
|---|---|---|
| 562,168 | Great Britain | June 21, 1944 |